US011872730B1

(12) United States Patent
Xie

(10) Patent No.: US 11,872,730 B1
(45) Date of Patent: Jan. 16, 2024

(54) METHOD AND APPARATUS FOR CREATING ENGINEERED STONE SLABS

(71) Applicant: Alex Xie, West Windsor, NJ (US)

(72) Inventor: Alex Xie, West Windsor, NJ (US)

( * ) Notice: Subject to any disclaimer, the term of this patent is extended or adjusted under 35 U.S.C. 154(b) by 0 days.

(21) Appl. No.: 18/232,201

(22) Filed: Aug. 9, 2023

(30) Foreign Application Priority Data

Jul. 7, 2023 (CN) .......................... 202310829174.8

(51) Int. Cl.
| | | |
|---|---|---|
| *B29C 43/34* | (2006.01) | |
| *B29C 43/00* | (2006.01) | |
| *B29C 43/02* | (2006.01) | |
| *B29C 43/58* | (2006.01) | |
| *B29K 105/00* | (2006.01) | |

(52) U.S. Cl.
CPC ............ *B29C 43/34* (2013.01); *B29C 43/003* (2013.01); *B29C 43/02* (2013.01); *B29C 43/58* (2013.01); *B29C 2043/3433* (2013.01); *B29C 2043/5875* (2013.01); *B29K 2105/0094* (2013.01)

(58) Field of Classification Search
CPC ... B29C 67/249; B29C 67/248; B29C 67/245; B29C 67/243; B29C 67/242; B29C 43/58; B29C 2043/025; B29C 2043/024; B29C 2043/023; B29C 2043/022; B29C 43/02; B29C 43/003; B29C 43/34
See application file for complete search history.

(56) References Cited

U.S. PATENT DOCUMENTS

| | | | |
|---|---|---|---|
| 9,511,516 B2 | 12/2016 | Xie | |
| 9,707,698 B1 | 7/2017 | Xie | |
| 10,376,912 B2 | 8/2019 | Xie | |
| 10,843,977 B2 | 11/2020 | Xie | |
| 2016/0089818 A1* | 3/2016 | Xie | ......................... B29C 39/04 425/134 |
| 2016/0221227 A1* | 8/2016 | Grzeskowiak, II | ..... B29C 39/12 |
| 2018/0194164 A1 | 7/2018 | Benito Lopez et al. | |
| 2021/0229313 A1* | 7/2021 | Rodriguez Garcia | .... B28B 3/02 |

FOREIGN PATENT DOCUMENTS

| | | |
|---|---|---|
| CN | 1669755 A | 3/2004 |
| ES | 2713776 B2 | 5/2019 |
| WO | WO2022/172242 A1 | 8/2022 |

\* cited by examiner

*Primary Examiner* — Stella K Yi
(74) *Attorney, Agent, or Firm* — Walter J. Tencza, Jr.

(57) ABSTRACT

A method which may include depositing a first mixture containing resin and aggregate minerals into a first mold; preparing a plurality of further mixtures; wherein the plurality of further mixtures, include at least a second mixture and a third mixture; wherein each of the plurality of further mixtures contain at least one of resin, colorant or aggregate minerals, wherein the plurality of further mixtures is combined by using at least one blending technique in order to blend the plurality of further mixtures into a variegated composite mixture; and further including depositing the variegated composite mixture into the first mold; and wherein the at least one blending technique and the depositing of the variegated composite mixture are computer controlled. Each of the plurality of further mixtures may have a higher resin percentage than the first mixture. The variegated composite mixture may have a viscosity value of at least ten thousand centipoise.

22 Claims, 13 Drawing Sheets

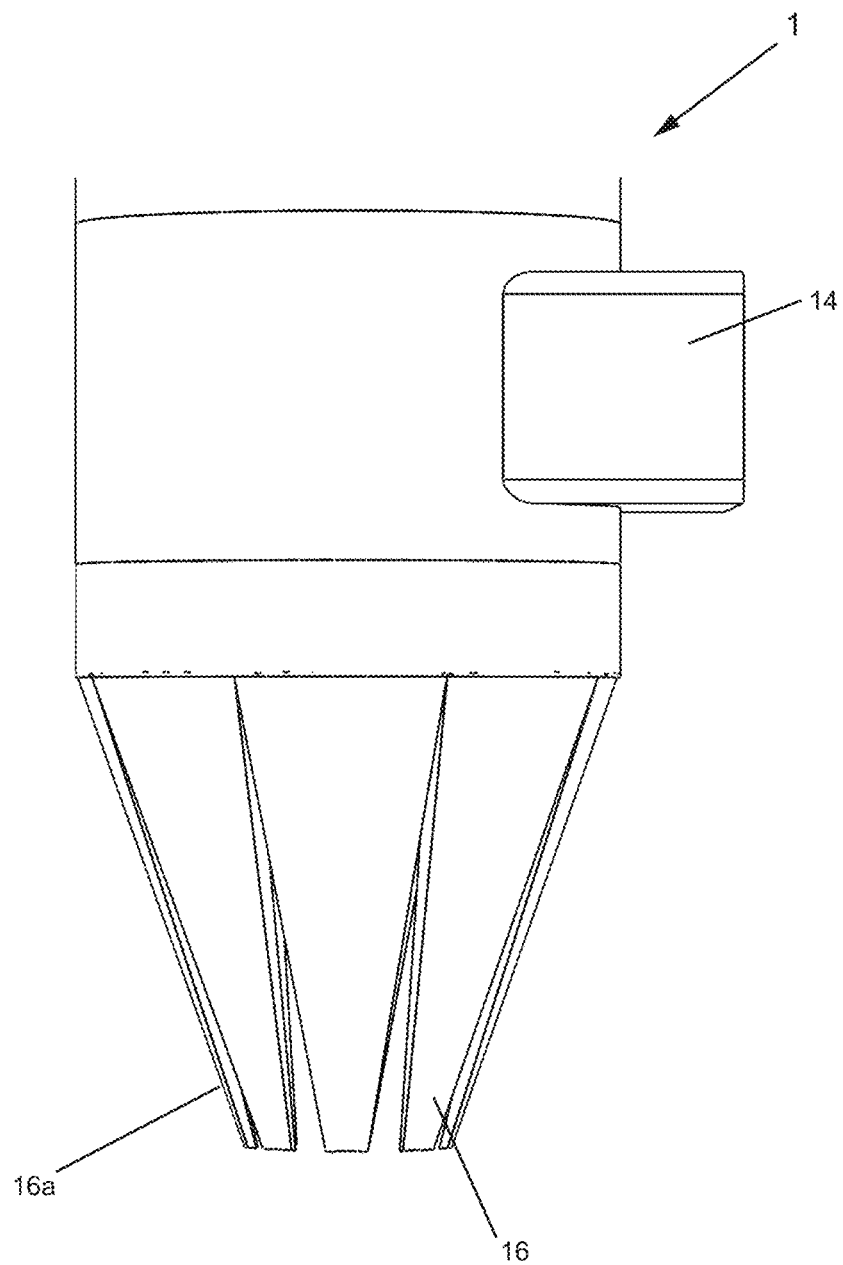

METHOD AND APPARATUS FOR CREATING ENGINEERED STONE SLABS

CROSS REFERENCE TO RELATED APPLICATION(S)

The present application claims the priority of Chinese patent application no. 202310829174.8, filed on Jul. 7, 2023 by inventor Alex Xie.

FIELD OF THE INVENTION

This invention relates to engineered stone slabs and apparatuses and methods for creating them.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications.

The production of engineered stone generally involves particulate materials such as ground quartz powder, quartz grits, crushed glass, rocks, pebbles, sand, shells, silicon, and other inorganic materials combined with polymers, binders, resins, colorants, dyes, etc. The particulate material(s) may be varying sizes ranging from over four hundred mesh particle size to four mesh particle size with multiple materials of different sizes used simultaneously. The polymer(s) may include agents such as a binder, hardener, initiator, or combination of such. The particulate material(s) and polymers, binders, resins, colorants, dyes, etc. are then mixed in a mixer resulting in a slightly damp homogeneous quartz mixture. This initial mixture may be processed through a lump breaker, which may be a known machine used to reduce lumps formed during mixing. The resultant, finer mixture may be poured into a supporting mold, tray, or other supporting structure. The mold or tray containing the damp quartz mixture is then moved onto a conveyor belt with a backing sheet, then the damp quartz mixture is moved into a vacuum press machine to compress the damp quartz mixture into a compressed slab. The compressed slab is then placed into a curing machine to be heated into a hardened slab. After curing, the hardened slab is generally moved to a grinder to be grinded down to a desired thickness, followed by a polisher to polish the surface of the slab.

Engineered stone slabs such as quartz have many advantages over natural stone such as marble and granite. Compared to these natural stones, quartz is harder, stronger, less water absorbent, and more resistant to staining, scratching, breakage, chemicals, and heat. One of the drawbacks of engineered stone is its perceived lack of natural, random looking veins and color patterns compared with natural stones.

Many known methods have been used to manufacture engineered stone to mimic the visual appearance of certain types of natural stones—such as marble, onyx, travertine, Calacatta marble, statuary marble, etc. However, it is very difficult to manufacture engineered stone with a visual appearance like that of natural stones due to limitations of known engineered stone manufacturing processes.

One of the more popular natural stones is a white marble called Calacatta marble, which is characterized by a bright white background with gray, gold, beige or brown blends of veins with varying thicknesses. Another popular natural stone is known as Statuary marble which is characterized by a white background with dark gray to light gray veins. A commonly used method in engineered stone to mimic Calacatta is by using molds, such as taught by European patent no. EP 3713729 B1, to Rodriguez Garcia, et al. This patent teaches placing one mold with the outline of veins inside a rectangular mold, filling the rectangular mold with a first quartz mixture, removing the inner mold so that there are channels which outline various veins, and filling the channels with a second quartz mixture of different color to simulate veins. There are many other methods that may be used in combination with the molds to make engineered stone Calacatta aesthetics look a little closer to natural Calacatta such as after filling a mold with a white quartz mixture and lifting the mold, spraying the vein channel walls with colorant prior to filling in the vein channels of the mold; or filling the vein channels with a variety of colored quartz mixtures that vary in color to try to more closely simulate natural Calacatta veining.

One difficulty is that the quartz mixture typically contains roughly 8%-16% resin, which results in a damp particulate mixture. When two mixtures of different color are placed next to each other and combined, the colors of each mixture will not penetrate, soak or blend into each other, and a distinct color boundary exists between the two mixtures. When finished as an engineered stone slab, it is easily identifiable as an artificial looking product. There is a desire to blend the colors together for a more smooth or gradual transition in both color and shade in order to better simulate the veins found in natural Calacatta.

SUMMARY OF THE INVENTION

The present invention, in one or more embodiments, is an improvement beyond known conventional methods of producing engineered stone slabs mimicking Calacatta marble or Statuary marble, in order to produce engineered stone slabs with variegated veins that look closer in appearance to the ones found in natural Calacatta marble or Statuary marble.

In at least one embodiment a method is provided which may include:

Designing a vein pattern mold that simulates the shape of veining found in a natural Calacatta or other marble slab and placing the vein pattern mold inside of a larger rectangular mold;

Step S1: Distributing or depositing a first mixture into a first mold, wherein the first mixture contains resin and aggregate minerals; and slightly compressing the first quartz mixture so that when the vein pattern mold is removed the first quartz mixture does not fall into vein channels or grooves.

Step S2: Preparing multiple intermediate mixtures in which each of the intermediate mixtures contains resin and either colorant or aggregate minerals. Combining two or more of the intermediate mixtures and using a blending process to obtain a variegated second mixture in which the variegated second mixture has two or more colors or gradients.

Step S3: Depositing the variegated second mixture into predefined location in the first mold.

Steps S1 and S2 may be computer controlled. One of the intermediate mixtures may be comprised of the first mixture or a mixture with similar raw material ratio.

Alternatively, the variegated second mixture may have a higher resin content than the first mixture.

Alternatively, the variegated second mixture may have a resin content of at least twenty percent by weight.

Alternatively, the viscosity of the second mixture may be at least 10,000 (ten thousand) centipoise.

The first mold may be a supporting structure or space for forming the slab, including supporting molds, trays or baskets. It may also be defined by laying gaskets and/or setting grids on a conveyor belt. Specifically, for example, a rectangular frame mold may be used with a length (L1)× width (W1) of roughly 3.25 meters×1.65 meters and a depth of roughly 0.0-5 meters.

In at least one embodiment the first mixture is a base mixture used to form a slab, generally comprised of quartz or other mineral aggregates of various sizes and includes resin, colorant, binders and other additives to obtain a slightly damp homogenous aggregate mixture.

The blending process described in step S2 may include controlling the amount added and timing for when the amount is added for each intermediate mixture, and the blending time, blending method and blending degree of each intermediate mixture to obtain a required variegated second mixture. A separation method may also be controlled so the intermediate mixtures are separated prior to blending.

The method of controlling the amount of each intermediate mixture may include controlling the force applied and how the force is applied, controlling the speed of the intermediate mixture and how the intermediate mixture is added such as pressure pumping, screw pumping, etc, and design of the path of each intermediate mixture such as by tubing, partitions, etc. The blending method may be comprised of various methods such as collision, superposition, pressing, crushing, etc or any combination of.

The two or more intermediate mixtures are fed under respective speeds or pressures from a separating region into a blending region where they are blended according to a specified order and ratio. This may include controlling the timing for when each intermediate mixture is introduced into the blending region, separating the intermediate mixtures until the appropriate time, blending by use of a blending tool or blending method, and controlling the blending speed or blending intensity in order to control the degree of blending according to a desired appearance of the variegated second mixture.

The variegated second mixture is obtained as a result of this controlled blending process of intermediate mixtures. The variegated second mixture may have distinct color separation or a gradient of two or more colors in order to simulate natural stones such as Calacatta or Statuary depending on the desired aesthetic and controlled blending method used. Defects such as distorted colors, blending to a homogenous mixture, and abrupt color changes may be avoided by controlling the blending method used. This variegated second mixture may be used to fill in grooves in the first mold such as in step S3 by depositing, spraying, or otherwise placing into predefined areas.

In at least one embodiment the blending process described in step S2 includes using a blending paddle. Step S3 includes controlling the method of placing the variegated second mixture into predefined positions of the first mold at any given time.

The method used to control the placement of the variegated second mixture may include manual placement, use of a computer controlled robotic arm, or other devices in order to inject or deposit the variegated second mixture. The variegated second mixture may be cut into strips of roughly the same width as a groove and pieced together into corresponding positions of the grooves.

An outlet structure may be connected to the main body after the blending region. The outlet structure may have a variable diameter in order to control the speed and amount of the variegated second mixture deposited at any given time. The variable diameter may be computer controlled.

Step S1 may include forming grooves in the first mixture in the first mold. Step S3 may include depositing the variegated second mixture into the grooves. Generally the grooves may be the corresponding regions where the veins are formed.

The formation of the grooves may be achieved by a variety of methods. In at least one embodiment a first mixture is deposited into a first mold, while there is a second mold placed in the first mold. The first mixture is therefore only deposited into the regions where the second mold is absent. Once the second mold is removed empty spaces are revealed, forming vein channels or grooves.

After the first mixture is deposited into the first mold while the second mold is placed inside the first mold, the first mixture may be compacted. This will prevent the first material from falling into the grooves as the second mold is removed. A carving tool may be used to carve additional grooves in the first mixture, as shown in Chinese Patent No. CN108127767A, to inventor Alex Xie, paragraphs [0006] through [0009]:

"A device comprising:
computer processor;
a tool device, which includes more than one working tool and coloring tool;
a first device configured to support said tool device;
a second device configured, in response to instructions from the computer processor, to move the tool device in the x-direction, the y-direction and the z-direction when the tool device is supported by the first device;
and an operating platform in which granular material is laid on:
Wherein the first device is configured relative to the operating platform, so that the working tool of the tool device is selected is configured to descend into the material in the z direction, and the tool assembly is configured to move in the x and/or y directions in response to instructions from the computer processor, while the alternatively configured work tool physically manipulates said material: The coloring tool configured to color the physically manipulated area of material after or concurrently with the physical manipulation of material by the work tool. Further, a movable member is laid between the operating platform and the material and/or the operating platform is part of a conveying device or a conveyor belt and the conveying device or conveyor belt is configured to respond to instructions from a computer processor. Further, the working tool is a rolling tool: when it is in a state of physically operating the material, the rolling tool is configured to be rotated and oriented around the z-axis, in a plane substantially parallel to the operating platform, which pass through the material to form channels or grooves; correspondingly, the coloring tool, which is configured to be oriented around the z-axis along with the rolling tool and move in the x and/or y direction accordingly, and after the rolling tool passes through the material, the groove marks or channel parts formed by it are colored. Specifically, the rolling tool can be a wheeled tool, such as a pressing wheel, and the pressing wheel can be turned to and positioned along with the advancing direction to press the material on the operating platform by rolling. The rolling tool may also be a shovel tool, such as a shovel, having a curved front surface that pushes the material on the conveyor belt in motion."

In an alternative embodiment, a slightly blended or variegated mixture may be prepared by other methods such as shown in U.S. Pat. No. 9,427,896 B1, to inventor Alex Xie, paragraphs [0004] through [0005], which is incorporated by reference herein:

"One or more embodiments of the present invention address a method, apparatus and system of producing a quartz based slab with color patterns and veining similar to natural stone. In at least one embodiment, a composite material is mixed which may include or may consist of particulate stone, quartz, glass shells or silicon mixed with polymer resins, dyes, binders, hardeners, initiators, or combination of such. This damp composite material is fed into a blending drum through one of multiple feeder channels. Each channel feeds a different composite material into the blending drum. The composite material can vary based on a number of factors such as particle size or dyes used. The blending drum is a cylindrical container with open top and an exit hole in the center of the bottom (can be located at any point on the bottom). Prior to feeding composite material into the drum, a cylindrical plug is lowered over the exit hole in order to prevent material from leaking out during the following process. The blending dram routes along the radius of the drum depositing material. A multiple pronged stirring apparatus is lowered and rates as material is being deposited, resulting in an even layer of material in the drum. Based on the desired design aesthetic, multiple layers of different or alternating composite material an be added to the drum in this fashion from different feeder channels." (quoted from U.S. Pat. No. 9,427,896 B1, to inventor Alex Xie, paragraphs [0004], incorporated by reference herein)

In at least one embodiment the step S3 may include cutting the variegated second mixture into bars or strips with comparable size to a portion of the groove. The strips are then placed into corresponding positions in the groove and joined. A computer program may identify the correct dimensions of a portion of a groove, control cutting strips of correct dimensions out of the variegated second mixture, and use a robotic arm to deposit the strips into the correct portion of the groove.

The method may further include:
Step S4: Vibrating and compacting the resultant composite material comprising the first mixture and variegated second mixture into a slab in a vacuum
Step S5: Curing the slab in a curing furnace
Step S6: Grinding, polishing and trimming the cured slab The blending device may include an inlet part and a main body part, in which the inlet part has n inlet channels or ports, where n>1. The intermediate mixtures may be introduced The main body part may include a separating region and a blending region. The separating region has n partitions that at least partially separate the intermediate mixtures. The inlet and outlet of each partition are respectively connected to an inlet channel and outlet to the blending region. The blending device is configured to feed and blend in response to computer controls, including starting and stopping the feeding, determining the speed and force of the feed, starting and stopping the blending, and determining the blending ratio and method. The blending method may include blending operations such as stirring, dissolving, etc, and related parameters such as stirring speed, timing, pressure, etc in response to computer controls. The feeding and blending, in addition to controlling the time and location each intermediate mixture is introduced, may determine the degree and pattern of blending in order to obtain a desired variegated second mixture.

Specifically there is at least one blending tool in the blending region, such as a blending paddle.

The degree of blending may depend at least in part on the structure and/or routing of the partitions or channels. For example, the design and testing of the structure and/or specific path of a single partition or channel may be performed by computer simulation by specifying the material properties of the intermediate mixture and forces applied to it throughout the path in order to obtain a desired variegated second mixture.

The blending device may also include an outlet structure, which is connected to the end of the blending region and has an outlet of variable diameter such as an adjustable nozzle which may vary in response to computer control. The size of the outlet may be adjusted in order to control the amount and speed of depositing.

In at least one embodiment the device used for blending may use alternative structures, such as one without partitions or separating regions between the intermediate mixtures.

In at least one embodiment, a method for manufacturing artificial stone slabs with variegated veins is provided, comprising the steps of: a first step of depositing a first mixture containing resin and aggregate minerals into a first mold; wherein the first mold is a supporting structure; a second step of preparing two or more intermediate mixtures containing resin, and at least one of colorant and aggregate minerals; combining the two or more intermediate mixtures using at least one blending technique in order to obtain a variegated second mixture; and wherein the variegated second mixture contains two or more colors or gradients; and further comprising an additional step of depositing the variegated second mixture into a predefined position in the first mold; wherein all or part of the second step and the additional step are computer controlled.

The variegated second mixture may have a higher resin content than the first mixture.

The resin content of the variegated second mixture may be at least twenty percent by weight.

The variegated second mixture may have a viscosity of at least ten thousand centipoise.

The method may further include combining the two or more intermediate mixtures using at least one blending technique which includes: controlling an amount of each of the two or more intermediate mixtures which is combined with an amount of each of the other of the two or more intermediate mixtures, controlling a timing for when the amount of each of the two or more intermediate mixtures is combined with the amount of each of the other of the two or more intermediate mixtures; controlling a blending time for how long the two or more of the intermediate mixtures are blended together; controlling a blending method for blending the two or more intermediate mixtures; controlling a blending degree for blending the two or more intermediate mixtures; and controlling a separation method wherein the two or more intermediate mixtures are separated prior to combining.

In at least one embodiment, the additional step of the method may include controlling a time at which the variegated second mixture is deposited into the first mold, and controlling a position with respect to the first mold, at which the variegated second mixture is deposited.

In at least one embodiment, the additional step of the method may include controlling a size of an outlet through which the variegated second mixture passes.

In at least one embodiment, the first step of the method may include: forming grooves in the first mixture in the first mold; and the additional step of the method may further comprise depositing the second mixture into the grooves.

In at least one embodiment, the first step may further include placing a second mold in the first mold, and wherein when the first mixture is deposited into the first mold, the first mixture is only deposited in an open region of the first mold which is not occupied by the second mold, and upon removal of the second mold the grooves are in the spaces the second mold was positioned in.

The first step may further include using a carving device to form grooves in the first mixture after the first mixture has been deposited.

In at least one embodiment, the step of combining two or more of the intermediate mixtures using at least one blending technique includes: layering two or more intermediate mixtures on top of each other; compressing the layered two or more intermediate mixtures; disrupting the layered and compressed two or more intermediate mixtures to form a fragmented layered compressed two or more intermediate mixtures, and compressing the fragmented layered compressed two or more intermediate mixtures to obtain the variegated second mixture, and the additional step includes cutting the variegated second mixture into a plurality of strips with each of the plurality of strips having approximately the same width as a corresponding portion of the grooves, depositing the plurality of strips, piecing together each of the plurality of strips into a corresponding position of the grooves.

In at least one embodiment, one of the two or more intermediate mixtures is the same as the first mixture.

In at least one embodiment, the method includes a fourth step of vibrating and compacting a combination of the first mixture and the variegated second mixture into a slab in a vacuum; a fifth step of curing the slab; and a sixth step of grinding, polishing and trimming the cured slab.

In at least one embodiment, an apparatus is provided which includes an inlet part and a main body part; wherein the inlet part has n inlet channels for a plurality of intermediate mixtures, wherein n>1; wherein the main body part includes a separating region and a blending region; wherein the separating region has n partitions at least partially separating the plurality of intermediate mixtures, and wherein the inlet and outlet of each of the n partitions are respectively connected to an inlet port and blending region, and wherein the apparatus is configured to feed and blend in response to computer controls which include: starting and stopping a feed of each of the plurality of intermediate mixtures, determining a feed amount and force for each of the plurality of intermediate mixtures; starting and stopping blending of the plurality of intermediates mixtures; and determining a blend ratio for blending of the plurality of intermediate mixtures, in response to computer controls wherein the apparatus is configured to be used in a blending process for manufacturing artificial stone slabs with variegated veins, comprising the steps of: a first step of depositing a first mixture containing resin and aggregate minerals into a first mold; a second step of preparing the plurality of intermediate mixtures containing resin, and at least one of colorant and aggregate minerals; combining two or more of the plurality of intermediate mixtures using at least one blending technique in order to obtain a variegated second mixture; and wherein the variegated second mixture contains two or more colors or gradients; and further comprising an additional step of depositing the second mixture into a predefined position in the first mold; wherein all or part of the second step and the additional step are computer controlled.

In at least one embodiment there is at least one blending device in the blending region of the apparatus.

In at least one embodiment of the apparatus, the degree of blending depends at least in part on a pathway of each of the plurality of intermediate mixtures.

In at least one embodiment of the apparatus, the degree of blending depends at least in part on a partition structure separating the plurality of intermediate mixtures.

In at least one embodiment of the apparatus an outlet structure is connected to an output of the blending region of the main body part, and the outlet structure has a variable diameter which may be controlled in response to computer processor.

BRIEF DESCRIPTION OF THE DRAWINGS

FIG. 1C shows a part of the blending device of FIG. 1A with the prongs in a closed state;

DETAILED DESCRIPTION OF THE DRAWINGS

Figure 1A:
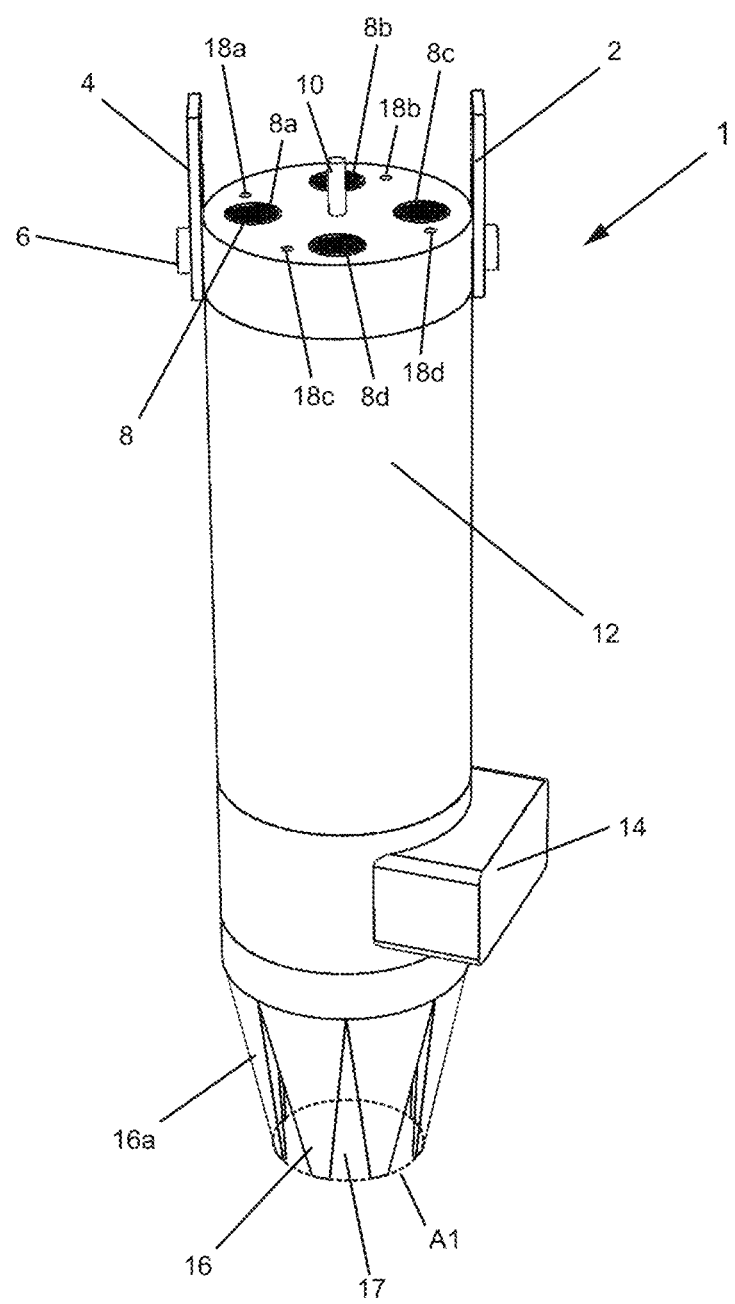
FIG. 1A shows a perspective view of a blending device according to an embodiment of the invention.

FIG. 1A shows a perspective view of a blending device 1 according to an embodiment of the invention.

Figure 1B:
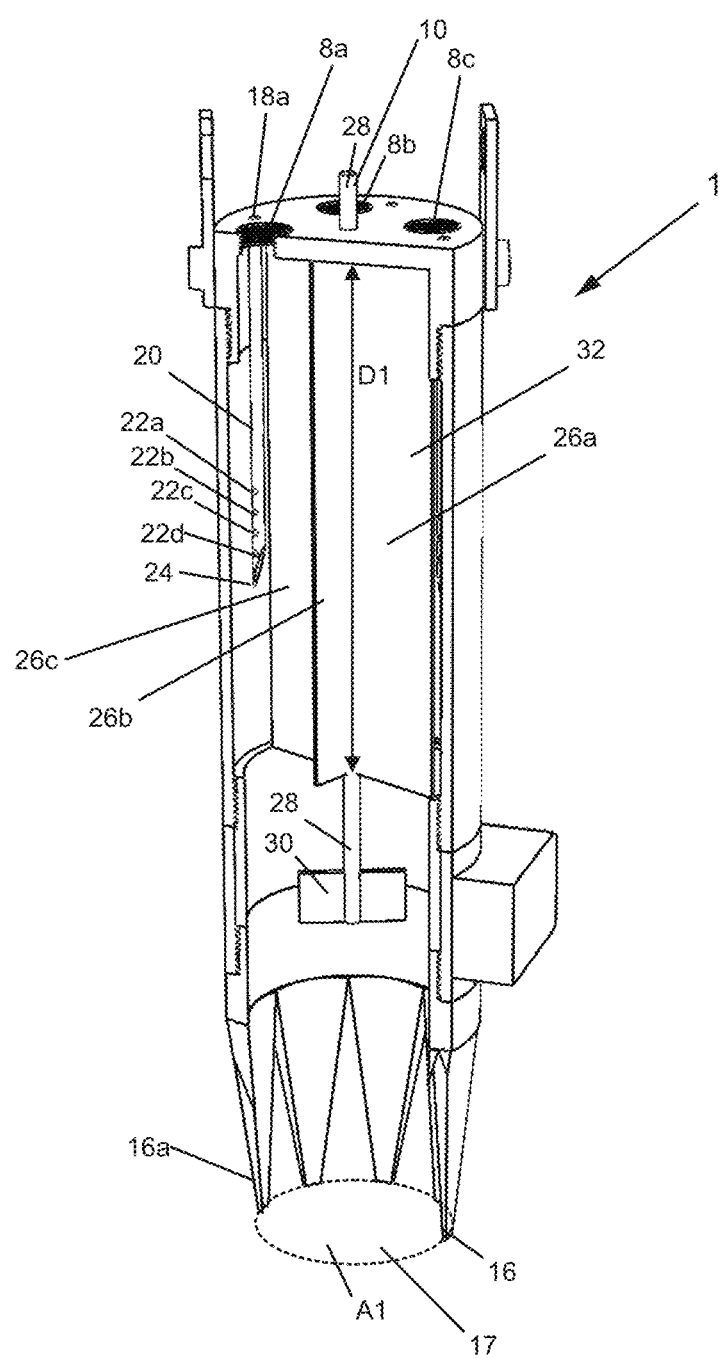
FIG. 1B shows a cross-sectional view of the blending device of FIG. 1A.

FIG. 1B shows a cross-sectional view of the blending device 1 of FIG. 1A.

FIG. 1C shows a part of the blending device 1 of FIG. 1A with the prongs in a closed state.

Figure 1D:
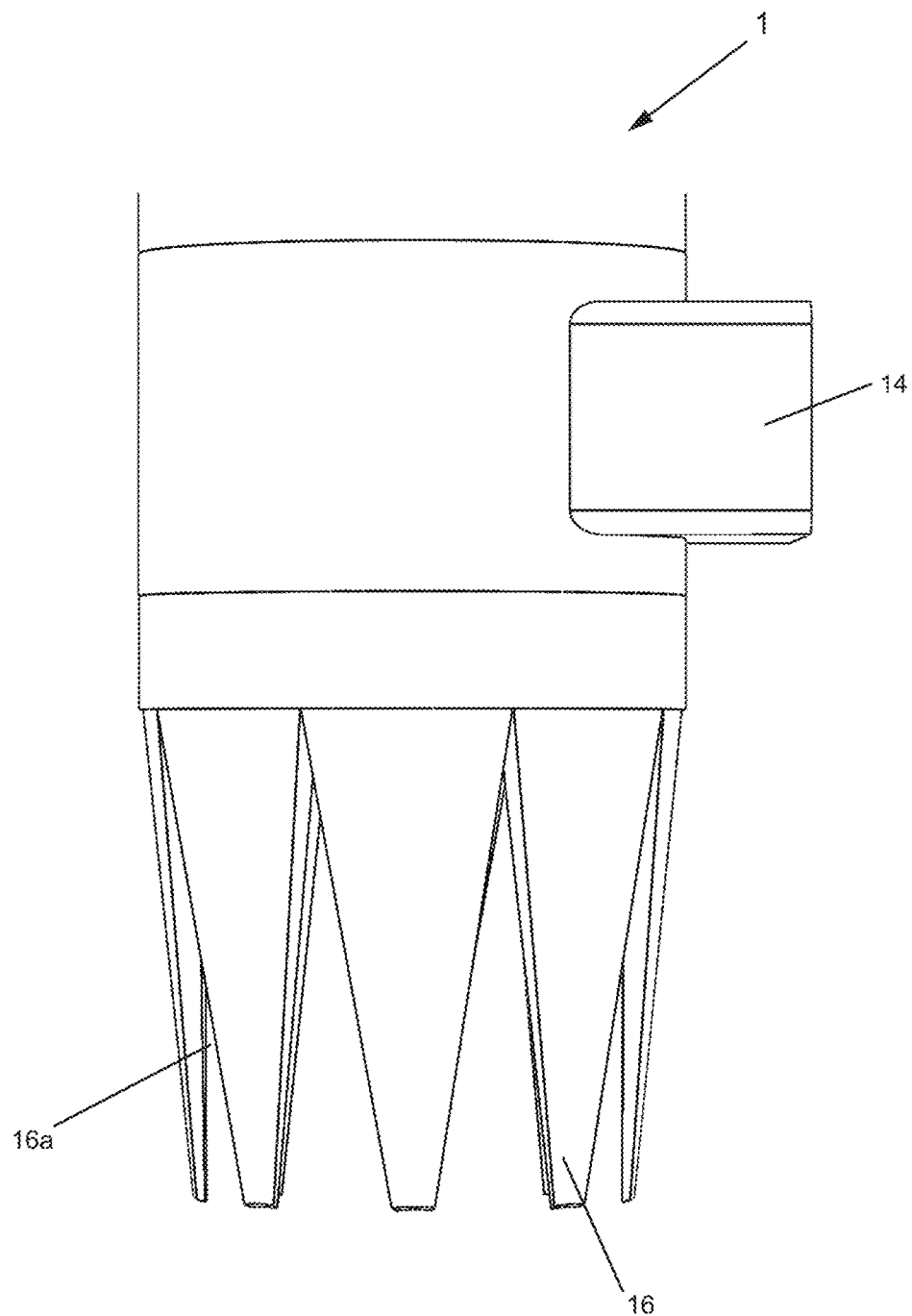
FIG. 1D shows a part of the blending device of FIG. 1A with the prongs in an open state.

FIG. 1D shows a part of the blending device 1 of FIG. 1A with the prongs in an open state.

Figure 1E:
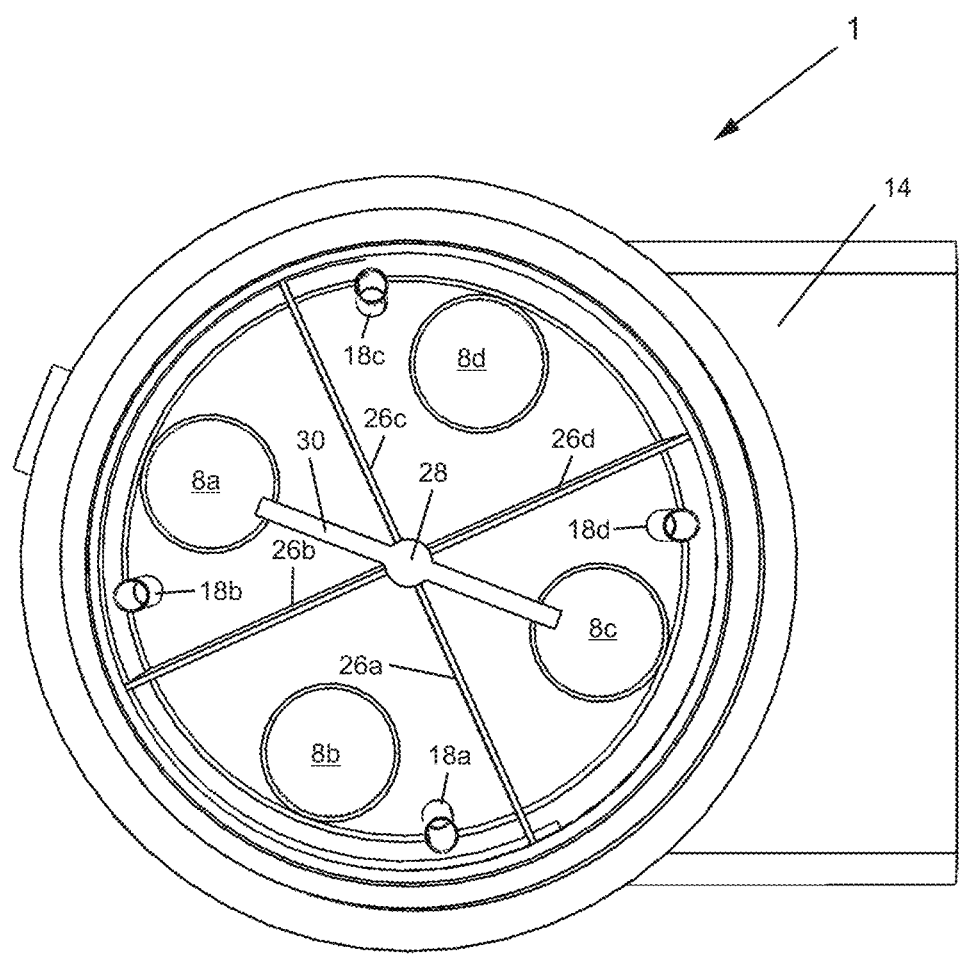
FIG. 1E shows a bottom view of the blending device of FIG. 1A without the prongs shown.

FIG. 1E shows a bottom view of the blending device 1 of FIG. 1A without the prongs shown.

Figure 2:
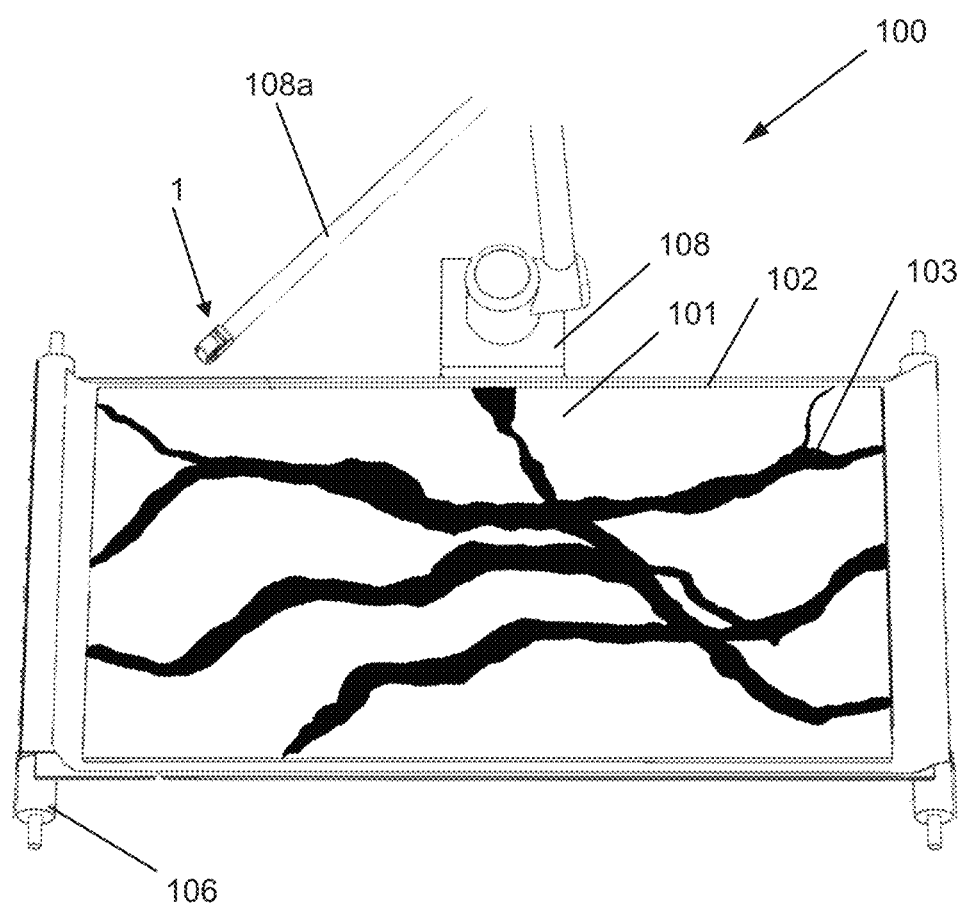
FIG. 2 shows a first mold placed on a conveyor belt device according to an embodiment of the present invention, with a second mold inside and not yet filled with mixtures, next to a robotic device which includes the blending device of FIG. 1A.

FIG. 2 shows a diagram 100 of a first mold 102 placed on a conveyor belt device 107 according to an embodiment of the present invention, with a second mold 103 inside and not yet filled with mixtures, next to a robotic device which includes the blending device of FIG. 1A.

Figure 3:
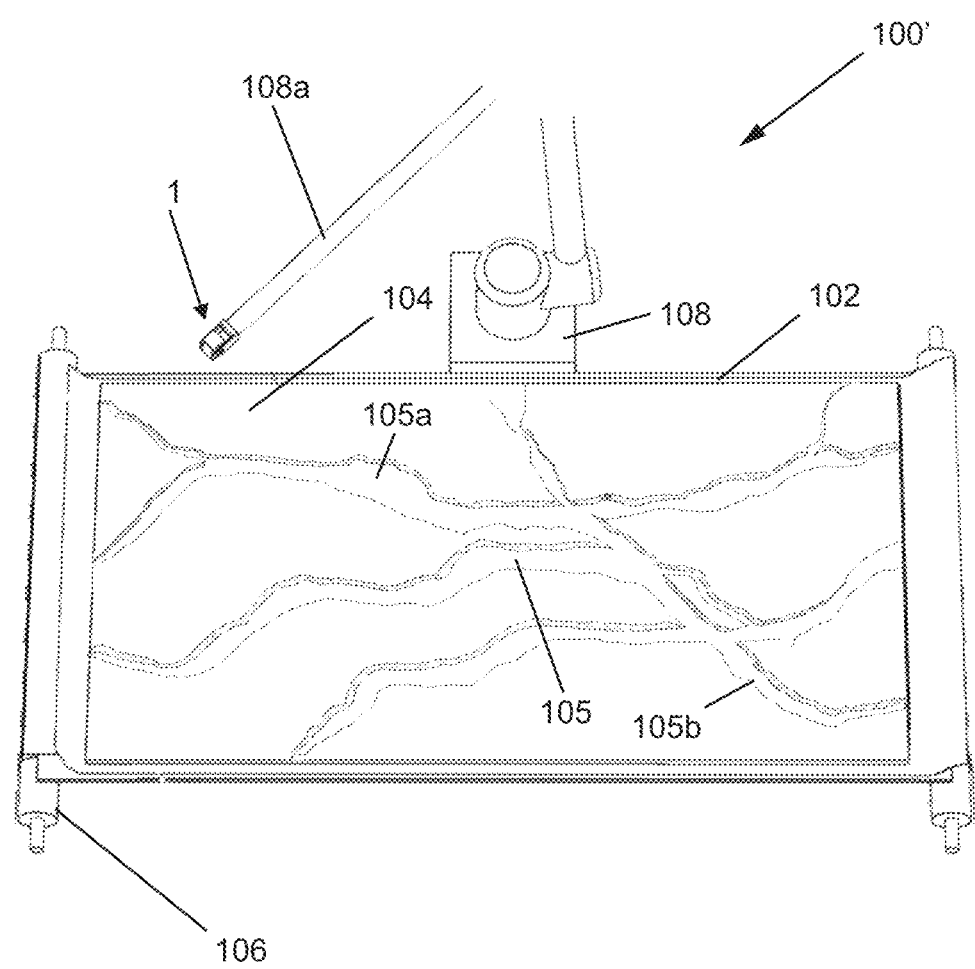
FIG. 3 shows a following state in which the first mixture has been fully deposited in the first mold, and the first mixture has been slightly compacted, and the second mold has been removed and a plurality of grooves has not been filled with the first mixture.

FIG. 3 shows a diagram 100' of a following state in which the first mixture 104 has been fully deposited in the first mold 102, and the first mixture 104 has been slightly compacted, and the second mold 103 has been removed and a plurality of grooves 105 including groove 105a has not been filled with the first mixture 104.

Figure 4:
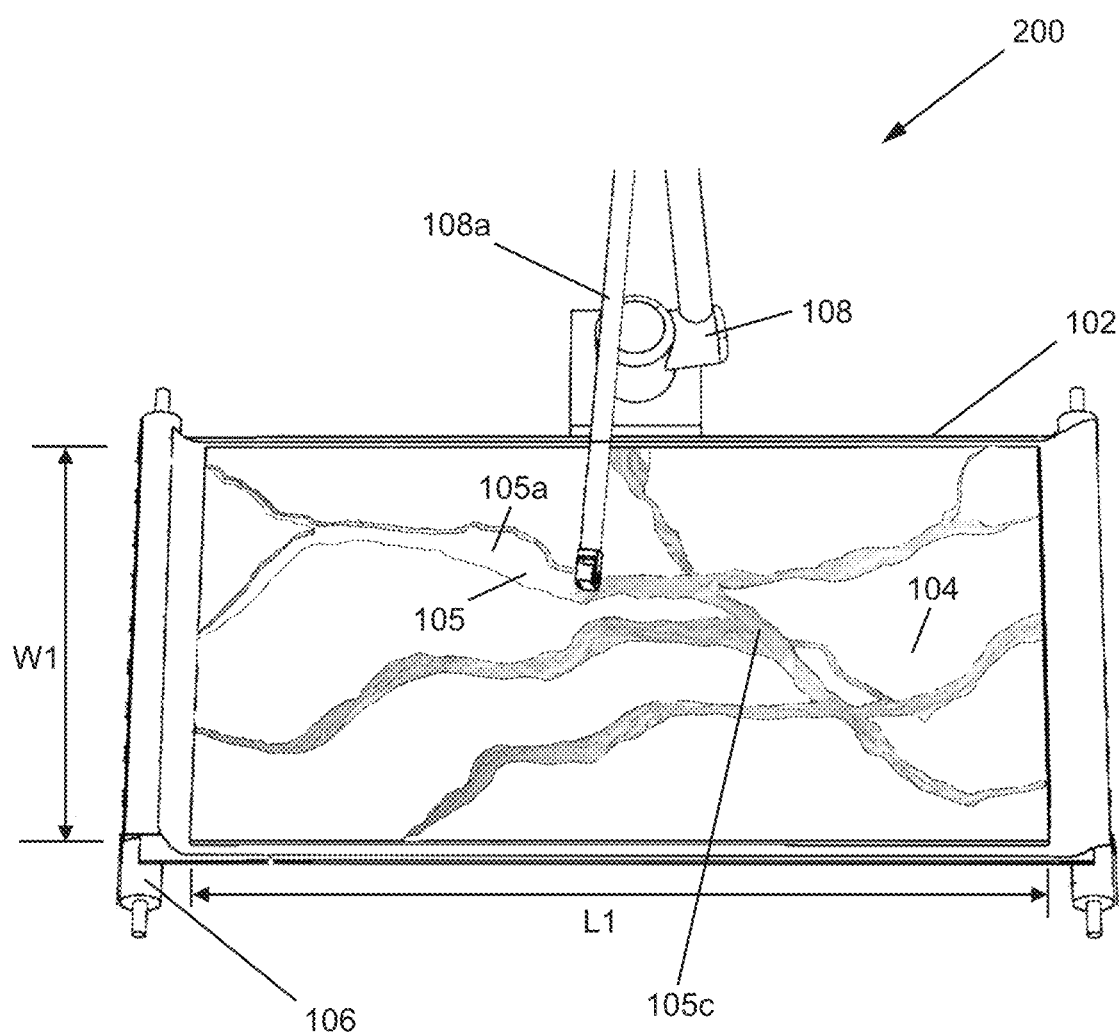
FIG. 4 shows a following state in which the first mold is on the conveyor belt device, there are a plurality of grooves in the first mixture, and portions of the grooves are filled with a mixture.

FIG. 4 shows a diagram 200 of a following state in which the first mold 102 is on the conveyor belt device 106, there are a plurality of grooves 105 in the first mixture 104, and portions of the grooves such as 105c are filled with a mixture.

Figure 5:
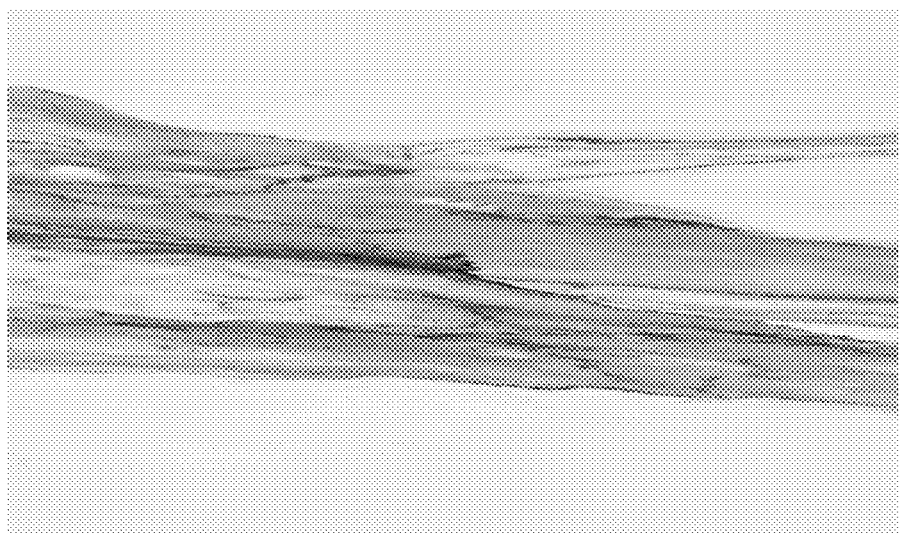
FIG. 5 shows a portion of a natural Calacatta stone, with a natural Calacatta vein.

FIG. 5 shows a diagram 300 of portion of a natural Calacatta stone, with a natural Calacatta vein.

Figure 6:
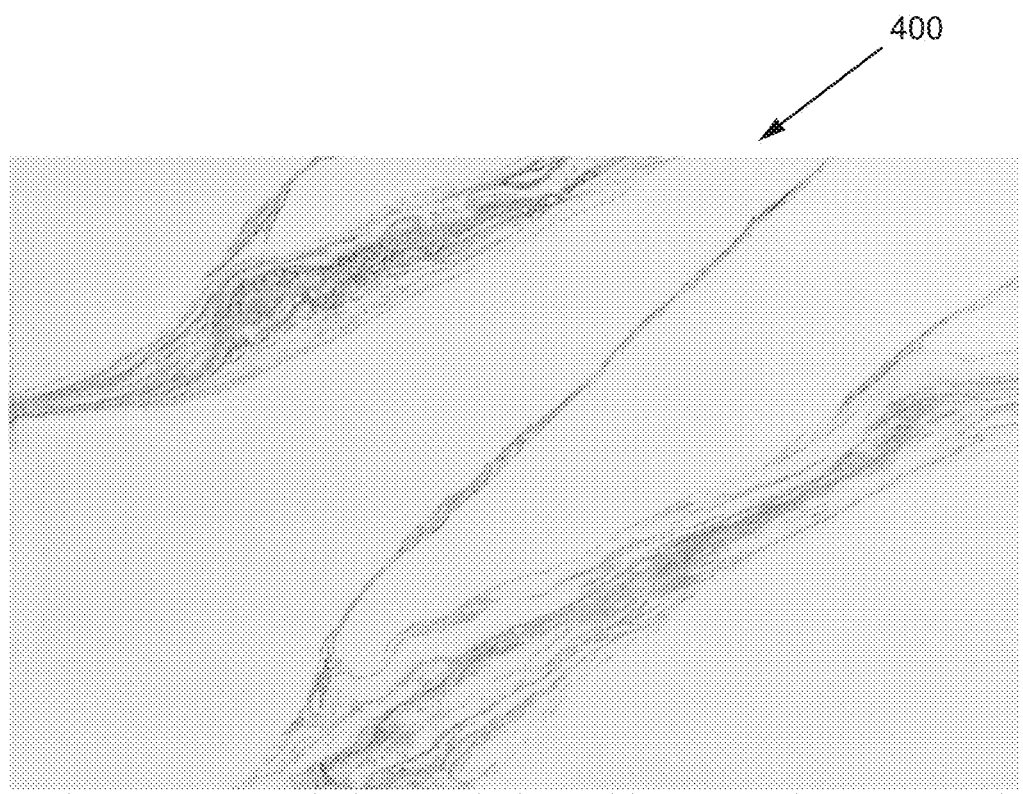
FIG. 6 shows a portion of an engineered stone with an artificial Calacatta vein formed in accordance with one or more methods of the present invention.

FIG. 6 shows a diagram 400 of a portion of an engineered stone with an artificial Calacatta vein formed in accordance with one or more methods of the present invention.

Figure 7:
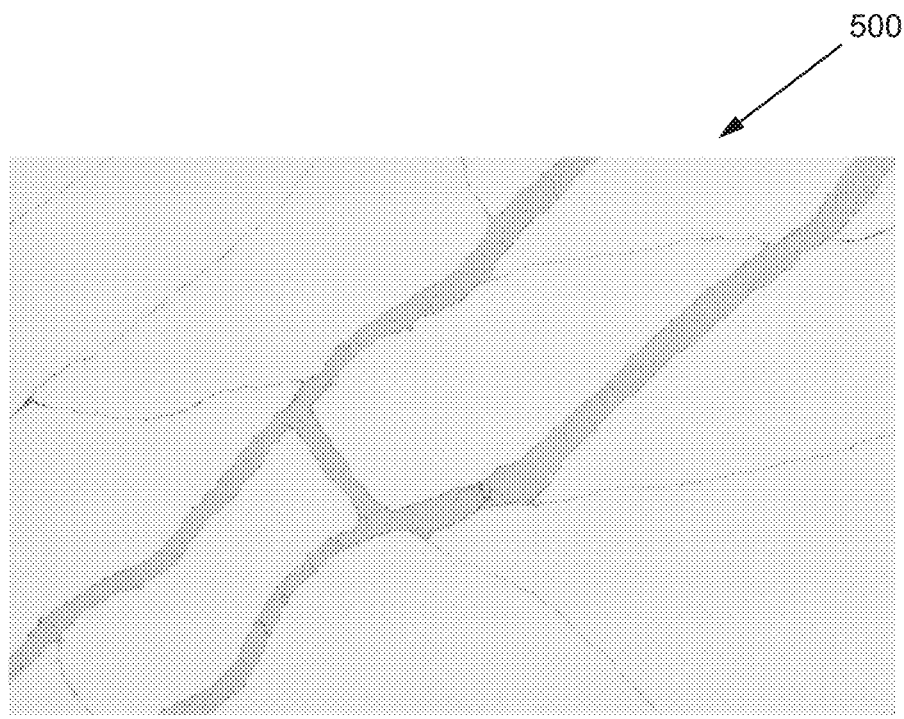
FIG. 7 shows a portion of an engineered stone with an artificial Calacatta vein known in the prior art.

FIG. 7 shows a diagram 500 of a portion of an engineered stone with an artificial Calacatta vein known in the prior art.

Figure 8:
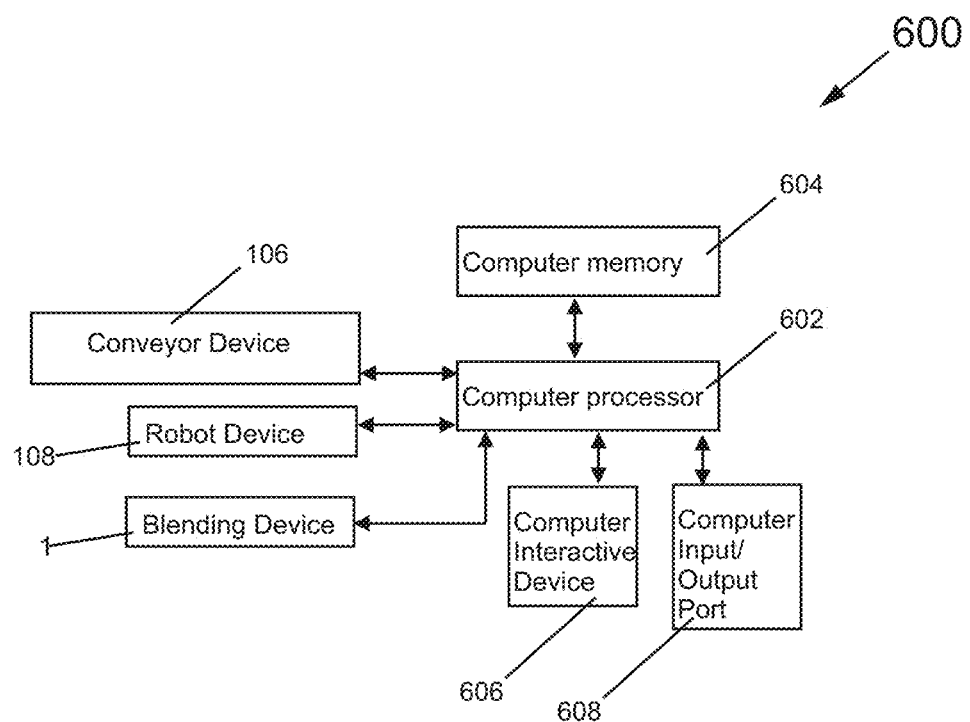
FIG. 8 shows a simplified block diagram of various components for use in accordance with one or more embodiments of the present invention.

FIG. 8 shows a simplified block diagram 600 of various components for use in accordance with one or more embodiments of the present invention.

Figure 9:
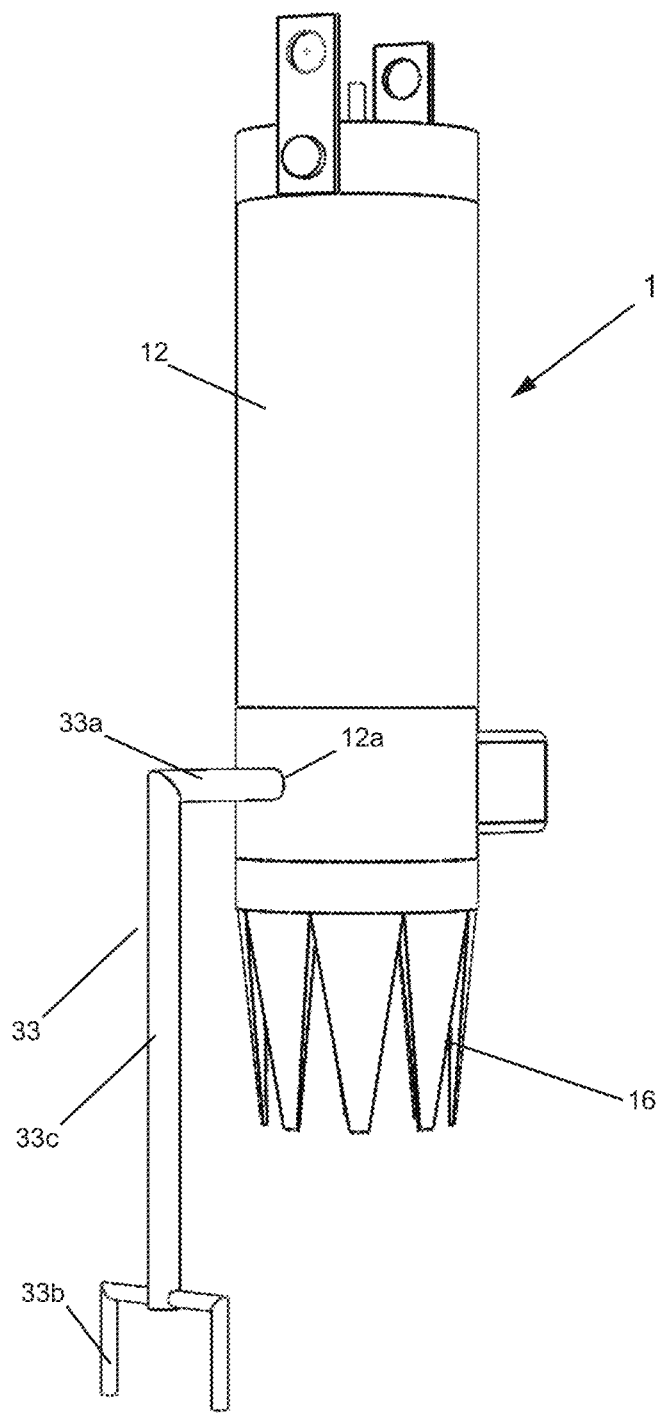
FIG. 9 shows a perspective view of a modified version of the blending device of FIG. 1A which includes an arm device for agitation or disruption of the mixtures

FIG. 9 shows a perspective view of a modified version of the blending device 1 of FIG. 1A which includes an arm device for agitation or disruption of the mixtures.

In at least one embodiment, a method is provided comprising:
(a) Designing a second mold 103, which simulates the appearance and characteristics of the veins that may be seen in natural Calacatta or other stone slabs, so the second mold 103 is a mold for forming veins.

In at least one embodiment, the second mold 103 is placed in a first mold 102, wherein the first mold 102 is a mold for forming a slab. Specifically, the length (L1) of the first mold 102, shown in FIG. 4, may be about 3.25 meters, the width (W1), of the first mold 102 shown in FIG. 4 may be about 1.65 meters, and the depth of the first mold 102 (into the page of FIG. 4) may be about 0.05 meters.

(b) Depositing the first mixture 104, shown in FIG. 3, in an inner region 101, shown in FIG. 2, of the first mold 102 while the second mold 103 is in the first mold 102 so that the first mixture 104 does not occupy the area occupied by second mold 103. The first mixture 104 is a mixture of resin and quartz particulate.

(c) Removing the second mold 103 after slightly compacting the first mixture 104 in the first mold 102. The method may further include removing the second mold 103 in order to form grooves 105, shown in FIG. 3, such as individual grooves 105a and 105b. Since the first mixture 104 has been slightly compacted, it will not fall into the grooves 105 after the second mold 103 is removed. In at least one embodiment, the second mold 103 may be designed so that the top is slightly wider than the bottom, in other to further prevent first mixture 104 from falling into the grooves 105 upon removal of the second mold 103. The grooves 105 correspond to the position where the veins are to be formed as seen in FIG. 3.

(d) Preparing two or more intermediate mixtures such that each intermediate mixture generally has higher resin content than the first mixture 104 or about 20% total resin content by weight. The intermediate mixtures may be more fluid than the first mixture 104 and have a specific viscosity and color. Colorant may be added in order to achieve the desired color, or multiple colorants such as gray and rusty gold. Mineral aggregates may also be added. One intermediate mixture may be the same as first mixture 104 or have a similar raw material ratio. The intermediate mixtures may be combined in order to obtain a variegated second mixture. The properties and blending ratio of the intermediate mixtures may be selected in order to achieve desired characteristics in the variegated second mixture such as color, viscosity, mechanical properties, etc.

(e) Feeding two or more intermediate mixtures into a blending device separately or simultaneously and controlling the degree of blending so that a variegated second mixture is obtained. Too much blending may result in too much variegation or a monochrome second mixture. Depositing the variegated second mixture into grooves 105 to form veins with desired color such as vein 105c as shown in FIG. 4.

(f) Further processing the uncured slab by compression and vibration while under a vacuum.

(g) Further process the uncured slab by curing in a furnace.

(h) Further processing the cured slab by grinding, polishing and trimming.

When comparing an engineered stone slab with Calacatta veins prepared by known prior art such as in FIG. 7 to an engineered stone slab with Calacatta veins prepared by the methods disclosed in the present invention as shown in FIG. 6, the variegated color transitions and patterns are more smooth and natural in FIG. 6 of an embodiment of the present invention, and closer to the appearance of natural Calacatta marble veins as shown in FIG. 5.

In an alternative embodiment, there is no second mold 103 used. An alternative method for forming the grooves 105 may be comprised of depositing the first mixture 104 in the first mold 102 substantially evenly, and compressing the first mixture 104 slightly or to a small degree which is typically just enough to prevent the first mixture 104 from falling into the grooves 105 as the grooves 105 are carved out but not large enough to have a hard time to carve out a groove A tool device may be used to process the grooves 105 into the first mixture 104. The tool device may perform actions such as carving, rolling, stirring, etc. Specifically, the processing steps for a rolling tool are disclosed in Chinese Patent No. CN108127767A, to inventor Alex Xie, paragraphs [0006] through [0012].

"A device comprising:
computer processor;
a tool device, which includes more than one working tool and coloring tool;
a first device configured to support said tool device;
a second device configured, in response to instructions from the computer processor, to move the tool device in the x-direction, the y-direction and the z-direction when the tool device is supported by the first device;
and an operating platform in which granular material is laid on:

Wherein the first device is configured relative to the operating platform, so that the working tool of the tool device is selected is configured to descend into the material in the z direction, and the tool assembly is configured to move in the x and/or y directions in response to instructions from the computer processor, while the alternatively configured work tool physically manipulates said material: The coloring tool configured to color the physically manipulated area of material after or concurrently with the physical manipulation of material by the work tool. Further, a movable member is laid between the operating platform and the material and/or the operating platform is part of a conveying device or a conveyor belt and the conveying device or conveyor belt is configured to respond to instructions from a computer processor. Further, the working tool is a rolling tool: when it is in a state of physically operating the material, the rolling tool is configured to be rotated and oriented around the z-axis, in a plane substantially parallel to the operating platform, which pass through the material to form channels or grooves; correspondingly, the coloring tool, which is configured to be oriented around the z-axis along with the rolling tool and move in the x and/or y direction accordingly, and after the rolling tool passes through the material, the groove marks or channel parts formed by it are colored. Specifically, the rolling tool can be a wheeled tool, such as a pressing wheel, and the pressing wheel can be turned to and positioned along with the advancing direction to press the material on the operating platform by rolling. The rolling tool may also be a shovel tool, such as a shovel, having a curved front surface that pushes the material on the conveyor belt in motion. The working tool can also be a stirring tool. The stirring tool may be configured to rotate around the z-axis in a plane substantially parallel to the operating platform. As the stirring tool rotates the material is agitated and reoriented. As the material is reoriented, the coloring tool may deposit colorant in the reoriented areas.

The tool device may operate either simultaneously, alternatively or sequentially."

In at least one embodiment after step (c) is completed in which grooves 105 are formed either by removal of the second mold 103 or by using a tool device, a colorant may be deposited onto groove walls such as 105b, shown in FIG. 3, to form a colored vein border that simulates natural marble veins.

In at least one embodiment, after the veins are formed in step (e), additional steps may be performed in order to create thinner cracked veins as seen in natural stone such as by the methods described in U.S. Pat. No. 10,376,912 B2 to inventor Alex (which is incorporated by reference herein) in order to create thinner fractured veins as seen in natural stone.

In at least one embodiment, the blending device described in step (e) may be device 1 shown in FIGS. 1A and 1B. The blending device 1 comprises mounting brackets 2 and 4, mounting pin 6, inlet parts 8 and 18, main body part 12 and an outlet part or nozzle 16 having outlet or opening 17 shown in FIGS. 1A and 1B.

Inlet holes may be arranged wherein one group of inlet holes 8a, 8b, 8c and 8d have a larger diameter for feeding intermediate mixtures with a higher ratio or that have a larger proportion of aggregate minerals, and the other inlet holes 18a, 18d, 18c and 18d have a smaller diameter for feeding intermediate mixtures with a smaller ratio or that have a larger proportion of resin and/or colorant with less viscosity.

The inner chamber 32 of the main body 12, shown in FIG. 1B, may have a separating region and a blending region. The separating region may include 4 partitions separated by 4 partition walls 26a, 26b, 26c and 26d, corresponding to the other end of inlet holes 8a, 8b, 8c and 8d respectively. The separating region may be arranged to occupy length D1, roughly ⅔ of the length of main body 12. The separating region may also include four syringe or tube structures such as syringe 20, which are respectively connected to the other end of inlet holes 18a, 18b, 18c and 18d. The syringes such as syringe 20 may be perforated with several holes such as 22a, 22b, 22c and 22d, and have a tip 24 as an outlet opposite to the end connected to inlet holes 18a, 18b, 18c and 18d. The separating region leads to a blending region wherein a stirring device 10, which may include paddle 30 and shaft 28 shown in FIG. 1B, is arranged. The stirring paddle 30 is driven by the fixed shaft 28, and the shaft 28 runs through the inner chamber 32 and is connected to a motor.

The outlet structure includes a nozzle 16 and an outlet control part 14, shown in FIG. 1A. The nozzle 16 is comprised of several tines 16a, and the outlet control part 14 is configured to respond to computer processor 602 in order to control the opening size of nozzle 16, and/or the flexing inwards (as shown in FIG. 10) of the plurality of tines 16a, or flexing outwards or straight projection (as shown in FIG. 1D) of the plurality of tines 16a. The tines such as 16a may be retracted or flexed closed or opened such as shown in FIGS. 1C and 1D respectively, such that the discharge area A1, shown in FIG. 1B, of the corresponding nozzle 16 may be smaller or larger respectively.

In at least one embodiment, the blending device 1 is configured to respond to instructions from computer processor 602, shown in FIG. 8, for feeding of intermediate mixtures through inlets 8 and 18, and blending through control of the start, stop and rotational speed of stirring device 10, as well as to determine the amount or rate of feed, the force associated with the feed, and control of the feed. For example, allowing one intermediate mixture to leak out of holes 22a, 22b, 22c and 22d prior to reaching tip 24 of the syringe 20 will lead to specific intermediate mixtures separated in that individual partition to begin blending prior to all of the intermediate mixtures reaching stirring device 10. In this manner it is possible to control the timing, ratios and degree of blending between individual intermediate mixtures as well as all of the intermediate mixtures as a whole.

In at least one embodiment, the blending device 1 is installed and fixed on the end of arm 108a of the robotic arm 108 through mounting brackets 2 and 4 and through pin 6 shown in FIG. 1A. The robotic arm 108 is connected and controlled through computer process 602; and configured to respond to instructions from computer processor 602 to manipulate the blending device 1 to implement the corresponding steps of step (e). The computer processor 602 is also connected and communicates with the conveyor belt device 106, the computer interactive device 606 (such as touch screen or computer mouse and keyboard), and computer input and output ports 608 (such as connecting to other devices), and executes a computer program stored in computer memory. The computer programs in memory 604 and relevant data are fed back to computer memory 604 to realize corresponding automatic production and control such as shown in FIG. 8.

The blending device 1 may also be equipped with an arm attachment 33, shown in FIG. 9, which is usually position such that after the variegated second mixture is deposited or filled into the grooves 105 by stirring, raking or pulling on the variegated second mixture filled into the groove 105*c*. The variegated second mixture is usually a viscous slurry and may be produced with certain color patterns or striations aimed at further imitating the appearance of natural stone.

In at least one embodiment as shown in FIG. 9, the arm attachment 33 includes a fixed rod 33*a* and an agitating structure 33*b*. Specifically, the agitating structure 33*b* may be a rake shaped structure. An installation hole 12*a* may be positioned as part of the lower part of the main body 12 of blending device 1, to which the upper end of the fixed rod 33*a* is inserted and fixed into. The lower end of fixed rod 33*a* may be fixed to agitating structure 33*b*. The arm attachment 33, including agitating structure 33*b*, are in a fixed position relative to the main body 12. As nozzle 16 of the blending device begins discharging the variegated second material in response to computer control and fills the grooves 105 under the manipulation of robotic arm 108*a*, the lower end of the agitating structure 33*b* is inserted into the variegated second mixture to a predetermined depth while following the movement of main body portion 12 of the blending device 1. This agitation or disruption by agitating structure 33*b* on the variegated second mixture and in some cases the surrounding first mixture further reorients the mixtures in order to more closely imitate natural stone. The agitating structure 33*b*, in at least one embodiment, is always being dragged behind the nozzle 16, when the structure 33*b* is inserted into the variegated second mixture in one of grooves 105 shown in FIG. 4.

In at least one embodiment, some intermediate mixtures may not contain any quartz, but only resin and other additives such as colorant. In addition, quartz may be replaced by other aggregate minerals used to produce engineered stone, any of the first mixture, variegated second mixture, or intermediate mixtures.

In at least one embodiment, the amount of resin in an intermediate mixture or variegated second mixture is greater than the amount of resin in the first mixture. For example, the resin content of the first mixture may be 8%-16% by weight, while the resin content of an intermediate mixture or variegated second mixture may be 20% or more by weight. More resin gives a mixture a more paste or slurry like consistency and viscosity, making it easier to add to certain blending devices and subsequent deposition into grooves 105 to simulate veins. More resin in the intermediate mixtures or variegated second mixture somewhat increases its controllability compared to a drier mixture such as the first mixture. The drier mixture tends to spread over a larger, more random area when deposited under pressure compared to a higher resin content mixture. The resin content of an intermediate mixture may vary from 20% by weight to over 99% by weight, and may include colorants of different colors and consistencies. By blending these different intermediate mixtures a desired viscosity and color pattern, variegation or striation may be obtained after limited blending. Among the intermediate mixtures, a mixture with a lower proportion of resin and a higher proportion of quartz may be called a quartz paste, while a mixture with a high proportion of resin such as over 99% by weight may be considered a colorant mixture. In the blending device 1, the combination of the quartz paste and colorant mixture is subjected to "limited blending" ("limited blending" depends on design, wherein "limited blending" results in between a total separation of different colors and a total mix so the mixture become one homogeneous color) in order to obtain a variegated second mixture, which is then deposited into the grooves 105. "Limited blending" may related to a time during which mixing occurs and/or a degree of mixing or agitation. The amount of each quartz paste and colorant mixture added to blending device 1 at any given point in time, the blending amount, and the corresponding variegated second mixture obtained, may be controlled by computer processor 602 so as to control the consistency of the variegated second mixture deposited at any given position of obtain a desired variegated vein effect.

For example, a computer processor 602 as shown in FIG. 8 controls the amount of intermediate mixture combination sent to blending device 1 shown in FIG. 1A. The nozzle 16 of blending device 1 moves along the groove 105, as shown in FIG. 3 and FIG. 4. In one example, the combination of intermediate mixtures includes 10% by weight a first colorant mixture, 20% by weight a first quartz paste, 50% by weight a second quartz paste, and 20% by weight a fourth quartz paste. In another example the intermediate mixture includes 5% by weight a first colorant mixture, 40% by weight a first quartz paste, and 55% by weight a third quartz paste. In at least one embodiment, the combination of the above intermediate mixtures are predetermined by programming in computer memory 604. The viscosity difference between each intermediate mixture will also be a factor in determining the degree of blending of different mixtures. By controlling the viscosity of each intermediate mixture, the degree of blending of the mixture combinations may be controlled such that one of the groove 105 has a different viscosity than the other end in order to further obtain color gradients from one end to the other as seen in natural stone.

According to at least one embodiment, the computer program 602 executes a program in computer memory 604 to control the total amount of deposition of the variegated second mixture obtained through limited blending for deposit into corresponding grooves 105 to form corresponding veins. The width and shape of the veins depends on the design of the second mold 103 in at least one embodiment.

According to at least one embodiment, the nozzle 16 of blending device 1 as shown in FIGS. 1C and 1D may be circular, rectangular, or other shapes such as chevron so that the tines 16*a* that constitute the nozzle 16 may be deformed to open and close accordingly.

The discharge area A1 shown in the dotted line in FIG. 1A and FIG. 1B correspond to the discharge port of the described blending device 1. The tines 16*a* may be controlled to move inwardly to approach each other or outwardly to move away from each other in order to adjust the size of the discharge area A1 accordingly. By controlling the size of the discharge area it is possible to control the amount of material deposited or discharged.

The discharge area A1 can generally be adjusted by computer processor 602 to control the amount of variegated second mixture at any given location. Limited blending may be achieved by apparatus 1, typically by computer processor 602 controlling the flow rate of each intermediate mixture and the nozzle 16 opening size. Similar to a soft serve ice cream machine or toothpaste, individual mixtures are extruded out of an opening. However, in these examples the individual mixtures are not blended, whereas in the present invention, limited blending is required so that the resultant variegated second mixture and the veins forming by depositing the variegated second mixture into grooves, blend or mix with each other in order to achieve a visual effect that is similar to natural stone such as marble.

In at least one embodiment, the blending device 1 may include an agitator 10, as shown in FIG. 1B, and configured to be controlled by a computer processor 602 for the agitation of intermediate mixtures in order to achieve the specific requirements for the degree of blending.

In at least one embodiment, the intermediate mixtures in the combination may pass through the partitions 26a, 26b, 26c and 26d as shown in FIG. 1E. into the blending region of the blending device 1. Alternatively, some intermediate mixtures in the combination may be blended first, depending on the design of the partitions. For example, a first quartz paste as a slurry and a first colorant mixture as a colorant may be mixed hallway through the apparatus, the first colorant mixture being injected through the smaller inlet port 18a into the syringe or tubular structure 20. The syringe 20 may have holes 22a, 22b, 22c and 22d, and the first quartz paste is injected into the inner chamber 32 of the blending device 1 through the larger inlet port 8a. The space formed by partition walls 26b and 26c separates the first quartz paste from the other spaces by a certain time or distance D1 so that the first colorant mixture may be dispersed into the first quartz paste in a controllable manner. The pressure applied to the reservoir of the first colorant mixture may be controlled by computer processor 602 and, in at least one embodiment, the computer processor 602 may control the first quartz paste flow rate. Subsequently, after passing distance D12, or below the ends of partitions 26a, 26b, 26c and 26d, the combination of the first quartz paste and first colorant mixture may be further blended with other intermediate mixtures accordingly. By designing appropriate paths and partitions 26a, 26b, 26c and 26d or other separating structures it is possible to control the timing and introduction of intermediate mixtures with each other in order to control the degree of blending between any individual intermediate mixture and the combination of multiple or all of the intermediate mixtures.

In summary, the combination of intermediate mixtures form a variegated second mixture of multiple colors with different degrees of blending are deposited or placed in corresponding grooves to form desired veins so as to better simulate the appearance found in certain natural marbles. The visual effect and appearance of the veins present will appear monochrome if the intermediate mixtures are excessively blended, and will appear as discrete colors if not mixed enough. By adopting reasonable parameters for the blending methods disclosed in the present invention, effective control for limited blending may be achieved to a certain extent to obtain a variegated second mixture which may then be deposited into grooves to form a vein that more closely imitates the appearance of natural stone in color and shape. Furthermore, by controlling the amount of variegated second mixture deposited at any given location, a visual effect that more closely resembles natural veining seen in natural marble can be achieved. In at least one embodiment relevant operating or control parameters may be changed such as rotating speed of the agitator 10, including shaft 28 and paddle 30, size of the discharge area A1, driving force applied to different feed ports such as 8a, 8b, 8c, 8d, 18a, 18b, 18c and 18d and the flow rate of each individual intermediate mixture.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method for manufacturing artificial stone slabs with variegated veins, comprising the steps of:
   a first step of depositing a first mixture containing resin and aggregate minerals into a first mold;
   wherein the first mold is a supporting structure;
   a second step of preparing two or more intermediate mixtures containing resin, and at least one of colorant and aggregate minerals;
   combining the two or more intermediate mixtures using at least one blending technique in order to obtain a variegated second mixture; and
   wherein the variegated second mixture contains two or more colors or gradients; and
   further comprising an additional step of depositing the variegated second mixture into a predefined position in the first mold;
   wherein all or part of the second step and the additional step are computer controlled;
   wherein the first step further comprises forming grooves in the first mixture in the first mold;
   wherein the additional step further comprises depositing the second mixture into the groove;
   wherein the step of combining two or more of the intermediate mixtures using at least one blending technique includes:
      layering two or more intermediate mixtures on top of each other;
      compressing the layered two or more intermediate mixtures;
      disrupting the layered and compressed two or more intermediate mixtures to form a fragmented layered compressed two or more intermediate mixtures, and
      compressing the fragmented layered compressed two or more intermediate mixtures to obtain the variegated second mixture, and
   wherein the additional step includes cutting the variegated second mixture into a plurality of strips with each of the plurality of strips having approximately the same width as a corresponding portion of the grooves, depositing the plurality of strips, piecing together each of the plurality of strips into a corresponding position of the grooves.

2. The method of claim 1 wherein
the variegated second mixture has a higher resin content than the first mixture.

3. The method of claim 1 wherein
the resin content of the variegated second mixture is at least twenty percent by weight.

4. The method of claim 1 wherein
the variegated second mixture has a viscosity of at least ten thousand centipoise.

5. The method of claim 1 wherein
the combining of the two or more intermediate mixtures using at least one blending technique includes:
   controlling an amount of each of the two or more intermediate mixtures which is combined with an amount of each of the other of the two or more intermediate mixtures,
   controlling a timing for when the amount of each of the two or more intermediate mixtures is combined with the amount of each of the other of the two or more intermediate mixtures;
   controlling a blending time for how long the two or more of the intermediate mixtures are blended together;

controlling a blending method for blending the two or more intermediate mixtures;

controlling a blending degree for blending the two or more intermediate mixtures; and controlling a separation method wherein the two or more intermediate mixtures are separated prior to combining.

6. The method of claim 5 wherein the additional step includes controlling a time at which the variegated second mixture is deposited into the first mold, and controlling a position with respect to the first mold, at which the variegated second mixture is deposited.

7. The method of claim 5 wherein the additional step includes controlling a size of an outlet through which the variegated second mixture passes.

8. A method for manufacturing artificial stone slabs with variegated veins, comprising the steps of:

a first step of depositing a first mixture containing resin and aggregate minerals into a first mold;

wherein the first mold is a supporting structure;

a second step of preparing two or more intermediate mixtures containing resin, and at least one of colorant and aggregate minerals;

combining the two or more intermediate mixtures using at least one blending technique in order to obtain a variegated second mixture; and wherein the variegated second mixture contains two or more colors or gradients; and further comprising an additional step of depositing the variegated second mixture into a predefined position in the first mold;

wherein all or part of the second step and the additional step are computer controlled; wherein the first step further comprises forming grooves in the first mixture in the first mold;

wherein the additional step further comprises depositing the second mixture into the grooves; and wherein the additional step includes cutting the variegated second mixture into a plurality of strips with each of the plurality of strips having approximately the same width as a corresponding portion of the grooves, depositing the plurality of strips, piecing together each of the plurality of strips into a corresponding position of the grooves.

9. The method of claim 1 wherein the first step further comprises placing a second mold in the first mold, and wherein when the first mixture is deposited into the first mold, the first mixture is only deposited in an open region of the first mold which is not occupied by the second mold, and upon removal of the second mold the grooves are in the spaces the second mold was positioned in.

10. The method of claim 1 wherein the first step further comprises using a carving device to form grooves in the first mixture after the first mixture has been deposited.

11. The method of claim 1 wherein one of the two or more intermediate mixtures is the same as the first mixture.

12. The method of claim 1 further comprising:

a fourth step of vibrating and compacting a combination of the first mixture and the variegated second mixture into a slab in a vacuum;

a fifth step of curing the slab; and a sixth step of grinding, polishing and trimming the cured slab.

13. The method of claim 8 wherein the variegated second mixture has a higher resin content than the first mixture.

14. The method of claim 8 wherein the resin content of the variegated second mixture is at least twenty percent by weight.

15. The method of claim 8 wherein the variegated second mixture has a viscosity of at least ten thousand centipoise.

16. The method of claim 8 wherein the combining of the two or more intermediate mixtures using at least one blending technique includes:

controlling an amount of each of the two or more intermediate mixtures which is combined with an amount of each of the other of the two or more intermediate mixtures, controlling a timing for when the amount of each of the two or more intermediate mixtures is combined with the amount of each of the other of the two or more intermediate mixtures;

controlling a blending time for how long the two or more of the intermediate mixtures are blended together;

controlling a blending method for blending the two or more intermediate mixtures;

controlling a blending degree for blending the two or more intermediate mixtures; and controlling a separation method wherein the two or more intermediate mixtures are separated prior to combining.

17. The method of claim 16 wherein the additional step includes controlling a time at which the variegated second mixture is deposited into the first mold, and controlling a position with respect to the first mold, at which the variegated second mixture is deposited.

18. The method of claim 16 wherein the additional step includes controlling a size of an outlet through which the variegated second mixture passes.

19. The method of claim 8 wherein the first step further comprises placing a second mold in the first mold, and wherein when the first mixture is deposited into the first mold, the first mixture is only deposited in an open region of the first mold which is not occupied by the second mold, and upon removal of the second mold the grooves are in the spaces the second mold was positioned in.

20. The method of claim 8 wherein the first step further comprises using a carving device to form grooves in the first mixture after the first mixture has been deposited.

21. The method of claim 8 wherein one of the two or more intermediate mixtures is the same as the first mixture.

22. The method of claim 8 further comprising:

a fourth step of vibrating and compacting a combination of the first mixture and the variegated second mixture into a slab in a vacuum;

a fifth step of curing the slab; and a sixth step of grinding, polishing and trimming the cured slab.

* * * * *